US011614141B2

(12) United States Patent
Bach-Esteve Burch

(10) Patent No.: US 11,614,141 B2
(45) Date of Patent: Mar. 28, 2023

(54) DAMPING MEANS OF AN ELECTRIC MOTOR OF AN AIRFLOW GENERATING APPARATUS AND SAID APPARATUS COMPRISING THE DAMPING MEANS

(71) Applicant: SOLER & PALAU RESEARCH, S.L., Parets del Valles (ES)

(72) Inventor: Albert Bach-Esteve Burch, Parets del Valles (ES)

(73) Assignee: SOLER & PALAU RESEARCH, S.L., Parets del Valles (ES)

( * ) Notice: Subject to any disclaimer, the term of this patent is extended or adjusted under 35 U.S.C. 154(b) by 337 days.

(21) Appl. No.: 16/884,379

(22) Filed: May 27, 2020

(65) Prior Publication Data

US 2020/0378467 A1    Dec. 3, 2020

(30) Foreign Application Priority Data

May 31, 2019 (EP) ..................... 19382442

(51) Int. Cl.
*F16F 15/12* (2006.01)
*H02K 5/22* (2006.01)
*H02K 5/24* (2006.01)
*H02K 5/26* (2006.01)

(52) U.S. Cl.
CPC ............. *F16F 15/12* (2013.01); *H02K 5/22* (2013.01); *H02K 5/24* (2013.01); *H02K 5/26* (2013.01)

(58) Field of Classification Search
CPC .... F16F 15/12; F16F 15/1201; F16F 15/1202; H02K 5/00; H02K 5/22; H02K 5/24; H02K 5/26
USPC ..................... 310/52, 54, 58, 64; 464/180
See application file for complete search history.

(56) References Cited

U.S. PATENT DOCUMENTS

| 5,521,447 A * | 5/1996 | Bertolini ................. H02K 5/24 310/91 |
| 10,890,179 B2 * | 1/2021 | Andreis .............. F04B 11/0008 |
| 2006/0090522 A1 * | 5/2006 | Kraffzik ................ F16F 3/0873 68/3 R |
| 2012/0111595 A1 * | 5/2012 | Schadow ................ B25F 5/006 173/162.2 |
| 2013/0154404 A1 * | 6/2013 | Willems ................. H02K 35/04 310/38 |
| 2014/0175926 A1 * | 6/2014 | Truillet ................... F04D 25/08 310/91 |
| 2019/0301492 A1 * | 10/2019 | Fujiwara ............... F04D 29/263 |

* cited by examiner

*Primary Examiner* — Rashad H Johnson
(74) *Attorney, Agent, or Firm* — Lucas & Mercanti, LLP

(57) ABSTRACT

The present invention relates to damping means of an electric motor of an airflow generating apparatus and an airflow generating apparatus having the damping device, the damping device having a first body, which defines a compartment for housing the electric motor (A); a second body for being arranged fixed to the apparatus, which defines a housing for housing the first body; and a damping element which is elastically deformable and has a longitudinal extension. The first body and the second body are separated from one another, the damping element being arranged such that it determines an attachment between the first body and the second body.

12 Claims, 3 Drawing Sheets

DAMPING MEANS OF AN ELECTRIC MOTOR OF AN AIRFLOW GENERATING APPARATUS AND SAID APPARATUS COMPRISING THE DAMPING MEANS

CROSS REFERENCE TO RELATED APPLICATION

This application claims the benefit of priority of European Patent Application No. 19382442.2, filed on May 31, 2019, which is incorporated herein by reference.

TECHNICAL FIELD

The present invention relates to the industry dedicated to airflow generating apparatus, such as air extractors and fans, and more specifically to the industry dedicated to controlling the temperature of electric motors in said apparatus to prevent noises generated by vibrations during the operation thereof.

BACKGROUND OF THE INVENTION

Electric motors for airflow generating apparatus, such as air extractors and fans, are widely known today, said electric motors being formed mainly by two parts, i.e., a rotor and a stator.

Both the stator and the rotor are discontinuous means, given that they have singular points which can be referred to as polarities. Therefore, when the rotor rotates while the stator remains static, pulsations are produced due to the polarities of the stator clashing in a discontinuous manner with the polarities of the rotor. These pulsations correspond with isolated and repeated rotational impulses transmitted to blades or vanes fixed with respect to the rotor. According to this, the electric motor provides a motor torque according to said pulsations, i.e., a discontinuous torque as it has peaks and valleys.

This operation of the electric motors leads to a tangential vibration of an outer shell of the electric motors themselves. This vibration is the most unwanted in electric motors and is intensified in electronic pole switching (brushless) electric motors the poles of which in the rotor are formed by magnets. Said tangential vibration is the source of noise and, when transmitted to adjacent elements mechanically attached to the electric motor, in turn causes these elements to vibrate, thereby amplifying the noise generated.

Furthermore, electric motors are arranged fixed or fastened to a structural element of the apparatus at a rear longitudinal end, i.e., opposite the end where the corresponding blades are located. According to this cantilever arrangement of the electric motors, they tend to bend due to the action of gravity such that the blades contact the side walls radially and externally surrounding them. This contact generates noise, in addition to damage to the blades and/or said side walls.

In view of these problems, the solution that is conventionally used consists of utilizing, as an intermediate element between the electric motor and the structural element for fixing the motor, an element made of an elastically deformable material for absorbing tangential vibrations and minimizing the bending or drop of the front longitudinal end where the blades are located. Depending on the characteristics typical of the corresponding electric motor, such as weight, longitudinal extension, and motor torque to be generated, for example, the element is provided according to a larger or smaller thickness.

However, this solution is not efficient in practice because the electric motor must be radially held with considerable strength or rigidity, while at the same time having certain capacity to move tangentially, i.e., certain capacity to rotate with respect to an imaginary longitudinal central axis thereof, which cannot be optimally afforded by means of the element as an intermediate element between the electric motor and the structural element for fixing the motor.

According to said solution that is conventionally used, the electric motor is held either insufficiently so as to prevent the blades form contacting the side walls of the compartment of the motor itself or excessively such that the tangential or rotational movement is transmitted to the adjacent elements mechanically attached to the electric motor. Unwanted noise is generated in either of the two cases or in both cases.

In view of the described drawback or limitation of the solutions existing today, a solution which allows partially absorbing tangential movements and preventing radial movements is required.

SUMMARY OF THE INVENTION

In order to achieve this objective and solve the technical problems described up until now, in addition to providing additional advantages which can be derived hereinafter, the present invention provides damping means of an electric motor of an airflow generating apparatus with a longitudinal measurement according to an imaginary central axis.

Likewise, the present invention provides an airflow generating apparatus with a longitudinal measurement according to an imaginary central axis comprising the damping means.

According to this, the present apparatus additionally comprises an electric motor. This electric motor in turn comprises a stator and a rotor for generating a rotational movement, and at least one blade arranged for suctioning and driving air.

The damping means comprise a first body which defines the location of a compartment for housing the electric motor, a second body for being arranged fixed to the apparatus, which defines the location of a housing for housing the first body, and a damping element which is elastically deformable and has a longitudinal extension.

According to this, the first body and the second body are separated from one another, the damping element being arranged such that it determines an attachment between the first body and the second body.

Preferably, a first imaginary longitudinal central axis can be defined in the first body and a second imaginary longitudinal central axis can be defined in the second body, the first imaginary longitudinal central axis and the second imaginary longitudinal central axis coinciding with one another.

The first body preferably comprises an inner side wall for radially and externally surrounding the electric motor and the second body comprises an outer side wall arranged radially and externally surrounding the inner side wall, the damping element being arranged attaching the inner side wall with the outer side wall.

Preferably, there are at least two damping elements, the damping elements being angularly distributed with respect to the imaginary central axis.

The damping element comprises a central wall, such that according to the longitudinal extension the central wall has two longitudinal ends and two elongated sides. Additionally or alternatively, the central wall has an elongated laminar configuration.

Preferably, the damping element comprises a constriction on at least one of the two elongated sides such that the central wall has a smaller thickness in correspondence with the constriction.

The damping element is preferably arranged such that an imaginary radial line can be defined perpendicular to the imaginary central axis and through the central wall from one of the two elongated sides to the other one of the two elongated sides.

The damping element preferably comprises an internal wall externally fixed to the first body, the central wall being attached along the internal wall according to a longitudinal central part of the internal wall. Additionally or alternatively, the damping element preferably comprises an external wall internally fixed to the second body, the central wall being attached along the external wall according to a longitudinal central portion of the external wall.

The damping element is preferably arranged to coincide in an imaginary plane perpendicular to the imaginary central axis containing a center of gravity of the electric motor. Likewise, the imaginary plane may coincide with a midpoint of the longitudinal extension of the damping element.

DETAILED DESCRIPTION OF THE INVENTION

Figure 1:
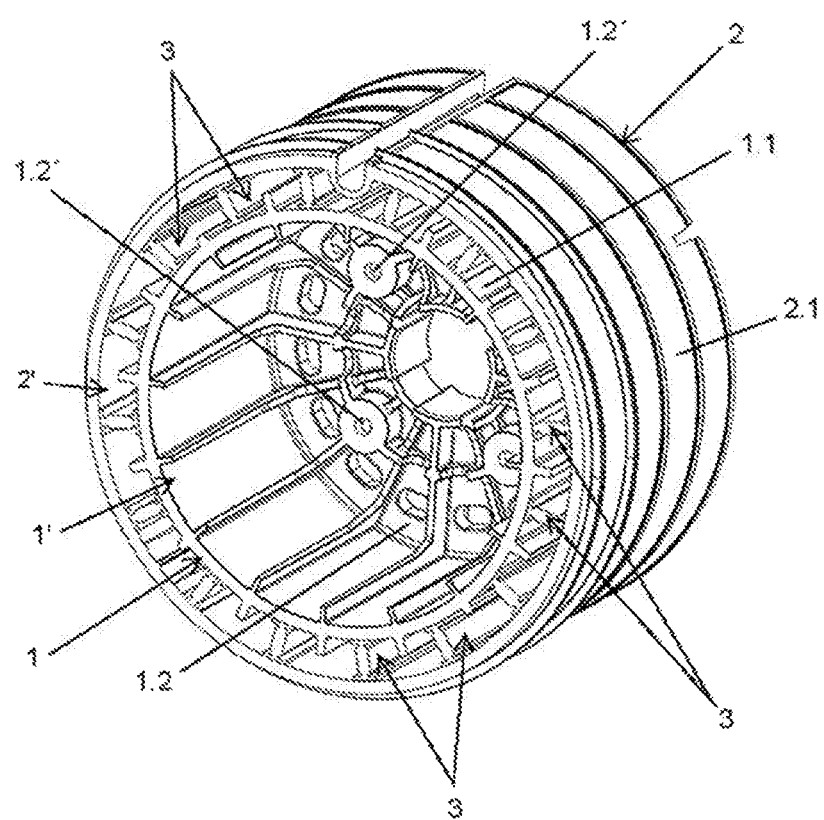
FIG. 1 shows a schematic perspective view of damping means of an electric motor of an airflow generating apparatus object of the invention.

The present invention relates to damping means of an electric motor (A) of an airflow generating apparatus, as well as to the airflow generating apparatus comprising said damping means, in addition to the electric motor (A). Preferably, the airflow generating apparatus is selected from an air extractor and a fan.

The electric motor (A) comprises a stator (A.1) and a rotor (A.2) for generating a rotational movement, and at least one blade (not shown in the drawings) arranged for generating the airflow, preferably acting either as an air extractor or as a fan. According to an optional example, the corresponding blades are mechanically attached directly to the rotor (A.2). According to another optional example, the electric motor (A) comprises an output shaft (A.2') mechanically attached to the rotor (A.2) such that the output shaft (A.2') rotates together with the rotor (A.2), with the corresponding blades being mechanically attached directly to said output shaft (A.2').

The damping means comprise a first body (1) and a second body (2) for arrangement of the electric motor (A) inside the apparatus, said apparatus a having longitudinal measurement or length according to an imaginary central axis (X) thereof. This imaginary central axis (X) can be seen in FIG. 3.

The first body (1) is arranged such that it defines the location of a compartment (1'), by way of a first volumetric space, for housing the electric motor (A). The second body (2) is in turn configured for being arranged fixed to the airflow generating apparatus, being arranged at the same time such that it defines the location of a housing (2'), by way of a second volumetric space, for housing the first body (1).

According to this, the compartment (1') is preferably defined in the housing (2'), i.e., the first volumetric space is defined in the second volumetric space. In other words, the housing (2') includes the compartment (1') in addition to an additional volumetric space, i.e., the second volumetric space includes the first volumetric space and said additional volumetric space.

The first body (1) comprises an inner side wall (1.1) for radially and externally surrounding the electric motor (A). According to this, said inner side wall (1.1) is arranged such that it has two ends and defines the compartment (1') for housing the electric motor (A). With the electric motor (A) being fixed in correspondence with the compartment (1'), said motor (A) can project to a greater extent than the inner side wall (1.1) through one of the ends. See FIG. 3.

Likewise, the first body (1) preferably comprises an internal axial wall (1.2). The electric motor (A) is thereby arranged preferably fixed to said internal axial wall (1.2) instead of to the inner side wall (1.1). According to this, the internal axial wall (1.2) has anchoring points (1.2') for the fixed arrangement of the electric motor (A). This fixed arrangement is preferably established by means of threaded attachments, such as the attachments afforded by means of screws, for example.

Preferably, the inner side wall (1.1) is to be arranged parallel, or substantially parallel, to said imaginary central axis (X). Preferably, the mentioned internal axial wall (1.2) is to be arranged perpendicular, or substantially perpendicular, to the imaginary central axis (X).

When the first body (1) comprises the internal axial wall (1.2), the inner side wall (1.1) has one of the ends at least partially closed by said internal axial wall (1.2) such that, together, they define the compartment (1') for housing the electric motor (A). Likewise, the inner side wall (1.1) has one of the ends open such that the electric motor (A) can be placed and removed with respect to the compartment (1') through same.

According to this, with the electric motor (A) being fixed in correspondence with the compartment (1'), said motor (A) can project to a greater extent than the inner side wall (1.1) through the corresponding open end. See FIG. 3.

The inner side wall (1.1) extends according to the imaginary central axis (X), i.e., longitudinally. A first imaginary longitudinal central axis in the first body (1), and more specifically with respect to the compartment (1') as well as with respect to the inner side wall (1.1), can therefore be defined. This first imaginary longitudinal central axis can be defined, going through the internal axial wall (1.2) and the open end or the two open ends. Preferably, this through arrangement is such that the first imaginary longitudinal central axis is perpendicular to the internal axial wall (1.2).

The second body (2) comprises an outer side wall (2.1) arranged radially and externally surrounding the inner side wall (1.1) such that it defines the housing (2') for housing the first body (1). Preferably, the outer side wall (2.1) is arranged parallel or substantially parallel to the imaginary central axis (X), the inner side wall (1.1), and/or the first imaginary longitudinal central axis.

More specifically, the outer side wall (2.1) is preferably configured for being arranged fixed to the airflow generating apparatus. This fixed arrangement is preferably established by means of threaded attachments, such as the attachments afforded by means of screws, for example. For this, the second body (2) comprises fixing points (not indicated in the drawings) preferably in correspondence with said outer side wall (2.1).

The mentioned outer side wall (2.1) has two terminals. Preferably, the two terminals are open, i.e., the second body (2) lacks an external axial wall closing one of the terminals of said outer side wall (2.1).

There is provided at least through one of the terminals of the mentioned outer side wall (2.1) the possibility of placing and removing the electric motor (A) with respect to the compartment (1'), said compartment (1') being defined in correspondence with the housing (2'). Likewise, when the electric motor (A) is arranged fixed to the internal axial wall (1.2), there is provided through the other terminal the possibility of handling fixing elements, such as nuts or screws, for example, for use in the fixed arrangement of the electric motor (A) in said internal axial wall (1.2).

With the electric motor (A) being fixed in correspondence with the compartment (1'), said motor (A) can project to a greater extent than the inner side wall (1.1) and the outer side wall (2.1) through the corresponding terminal. See FIG. 3.

The outer side wall (2.1) extends according to the imaginary central axis (X), i.e., longitudinally. A second imaginary longitudinal central axis in the second body (2), and more specifically with respect to the housing (2') as well as with respect to the outer side wall (2.1), can therefore be defined. This second imaginary longitudinal central axis can be defined, going through the two terminals of the outer side wall (2.1). Preferably, this through arrangement is such that the second imaginary longitudinal central axis is perpendicular to the internal axial wall (1.2).

Figure 3:
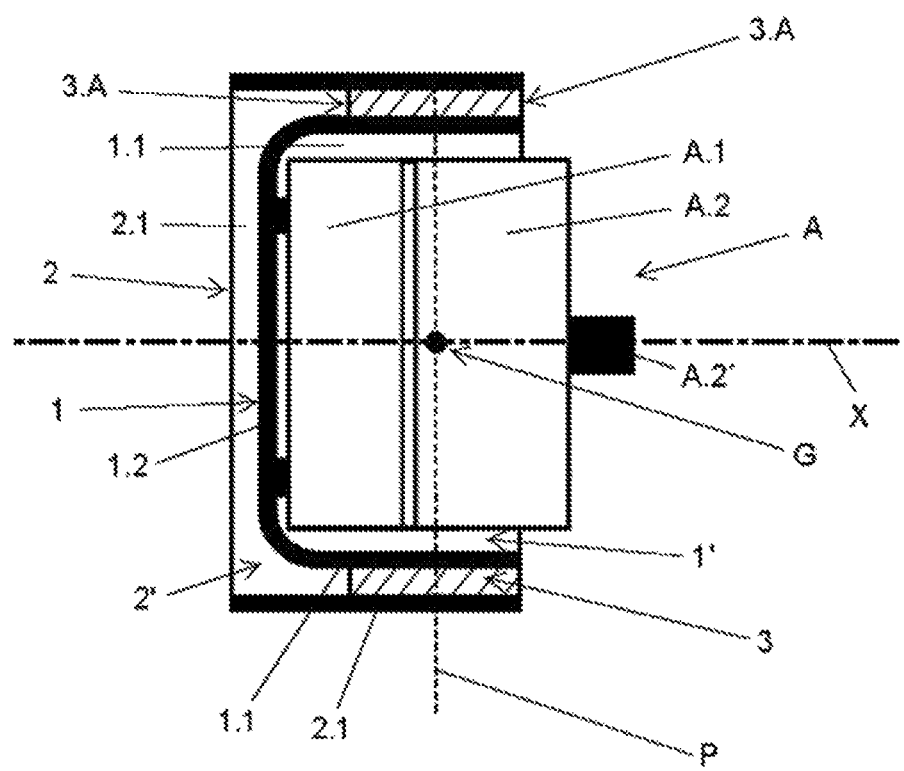
FIG. 3 shows a schematic sectional side view of the damping means with the electric motor arranged fixed therein.

Preferably, the second imaginary longitudinal central axis of the second body (2) coincides with the first imaginary longitudinal central axis of the first body (1). Likewise, said first imaginary longitudinal central axis of the first body (1) may coincide with the imaginary central axis (X) of the apparatus. Additionally or alternatively, said second imaginary longitudinal central axis of the second body (2) may coincide with the imaginary central axis (X) of the apparatus. FIG. 3 depicts the imaginary central axis (X) coinciding both with the first imaginary longitudinal central axis and with the second imaginary longitudinal central axis.

Both the first body (1) and the second body (2) are configured and arranged to provide a hollow space, said hollow space being radially and externally arranged with respect to the first body (1) and radially and internally arranged with respect to the second body (2). Likewise, said hollow space extends from one of the terminals to the other terminal of said second body (2). The outer side wall (2.1) and the inner side wall (1.1) are thereby separated from one another, specifically by the described hollow space, i.e., they do not contact one another directly.

The damping means comprise a damping element (3), and preferably a plurality of damping elements (3). According to this, there are preferably between 2 and 36, more preferably between 3 and 24, even more preferably between 4 and 18, and yet more preferably between 8 and 16 damping elements (3). The larger the number of damping elements (3), the greater the resistance offered against the tendency of the first body (1) to move radially, i.e., perpendicularly with respect to the imaginary central axis (X), will be. This tendency is primarily generated by the actual weight of the first body (1). Additionally, said tendency may be generated by the weight that can be associated with the electric motor (A) and the weight of the corresponding blades.

The damping element (3) is elastically deformable. According to this, the damping element (3) is made of an elastomer material, such as gum or rubber, for example. Likewise, the damping element (3) has a longitudinal extension.

When there are two or more damping elements (3), these damping elements (3) are preferably arranged angularly distributed with respect to the imaginary central axis (X). This arrangement can be seen in FIG. 1, for example.

Each of the damping elements (3) is arranged such that it determines an attachment between the first body (1) and the second body (2). More specifically and according to what has been described, each of the damping elements (3) is arranged attaching the inner side wall (1.1) with the outer side wall (2.1).

The damping element (3) comprises a central wall (3.1), preferably with an elongated laminar configuration, arranged to prevent or block the tendencies of the first body (1) to move radially or perpendicularly with respect to the imaginary central axis (X), the first second imaginary longitudinal central axis, and/or the second imaginary longitudinal central axis.

This central wall (3.1) is configured such that, according to the longitudinal extension of the damping element (3), two longitudinal ends (3.A) and two elongated sides (3.B) can be defined in said central wall (3.1). According to this, the two elongated sides (3.B) are attaching the two longitudinal ends (3.A) to one another. Furthermore, the elongated sides (3.B) have an extension or a longitudinal measurement preferably greater than the longitudinal ends (3.A). See FIGS. 2A and 3, for example.

Figure 2A:
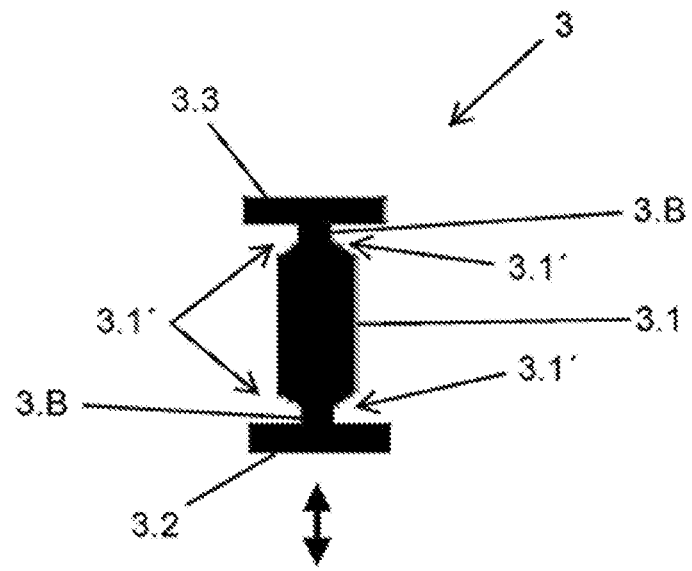
FIGS. 2A and 2B show schematic front views of a damping element comprised in the damping means object of the invention.

FIG. 2A depicts by means of a double-headed arrow the tendency of the damping elements (3) to elastically deform according to the mentioned radial movement tendency. This radial movement tendency is counteracted by the central wall (3.1), said wall (3.1) being subjected to traction or compression from or through the elongated sides (3.B).

Each of the damping elements (3) comprises a constriction (3.1') on at least one of the two elongated sides (3.B) such that the central wall (3.1) has a smaller thickness in correspondence with the constriction (3.1'). Preferably, one of the constrictions (3.1') is located on one of the two elongated sides (3.B) and the other constriction (3.1') is located on the other one of the two elongated sides (3.B).

Each of the constrictions (3.1') provides elastic deformation of the damping elements (3) according to tangential or rotational movements of the first body (1) as a result, for example, of the operation of the electric motor (A). In turn, the constrictions (3.1') provide partial absorption or reduction of the tendency of said tangential movements being generated in the second body (2). In other words, the constrictions (3.1') allow a relative rotational movement between the first body (1) and the second body (2), a rotational back and forth movement of the first body (1) being allowed while the second body (2) remains static or on standby.

Figure 2B:
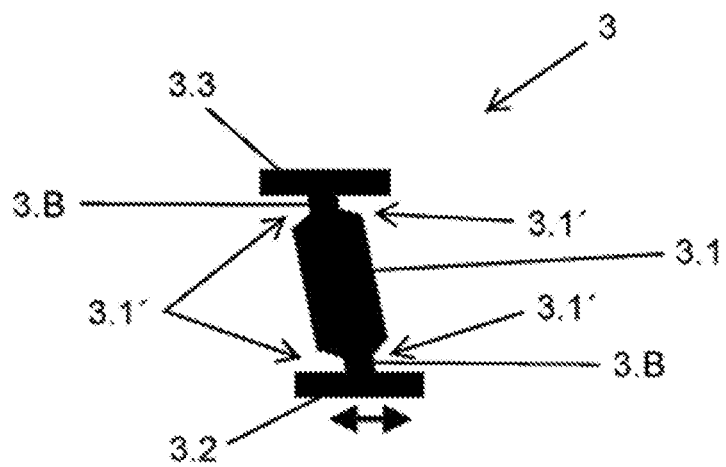

FIG. 2B depicts by means of another double-headed arrow the tendency of the damping elements (3) to elastically deform according to tangential or rotational movements. Likewise, one of the damping elements (3) elastically deformed according to one of the tangential or rotational movements can be seen in said FIG. 2B.

Likewise, the constrictions (3.1') preferably correspond with cavities according to both faces of the central wall (3.1), as can be seen in FIGS. 2A and 2B. In other words, the thickness of the central wall (3.1) is reduced both on one face and on the other, and preferably by the same amount. Both faces are dimensionally demarcated by the two longitudinal ends (3.A) and the two elongated sides (3.B).

Each of the damping elements (3) additionally comprises an internal wall (3.2) externally fixed to the first body (1), and more specifically to the inner side wall (1.1). The internal wall (3.2) has a thickness preferably between 0.1 mm and 5 mm, more preferably between 0.5 mm and 3 mm, and even more preferably between 1 mm and 2.5 mm.

According to this, the central wall (3.1) is attached to the internal wall (3.2) along said internal wall (3.2) according to a longitudinal central part having a width of said internal wall (3.2). By means of the internal wall (3.2), a larger fixing surface is thereby provided between the damping element (3) and the first body (1), and more specifically between the damping element (3) and the inner side wall (1.1), than by means of the central wall (3.1).

Likewise, according to the thickness of the internal wall (3.2), said wall (3.2) provides greater resistance against the tendency of the first body (1) to move radially by both traction and compression according to contact faces with the corresponding central wall (3.1) and with the first body (1). This arrangement or configuration can be seen in both FIG. 2A and FIG. 2B.

Each of the damping elements (3) additionally comprises an external wall (3.3) internally fixed to the second body (2), and more specifically to the outer side wall (2.1). The external wall (3.3) has another thickness preferably between 0.1 mm and 5 mm, more preferably between 0.5 mm and 3 mm, and even more preferably between 1 mm and 2.5 mm. Preferably, the thickness of the internal wall (3.2) and the other thickness of the external wall (3.3) are the same.

According to this, the central wall (3.1) is attached to the external wall (3.3) along said external wall (3.3) according to a longitudinal central portion having a width of said external wall (3.3). By means of the external wall (3.3), a larger fixing surface is thereby provided between the damping element (3) and the second body (2), and more specifically between the damping element (3) and the outer side wall (2.1), than by means of the central wall (3.1).

Likewise, according to the other thickness of the external wall (3.3), said wall (3.3) provides greater resistance against the tendency of the first body (1) to move radially by both traction and compression according to contact faces with the corresponding central wall (3.1) and with the first body (1). This arrangement or configuration can be seen in both FIG. 2A and FIG. 2B.

According to the tangential or rotational movements of the first body (1) with respect to the imaginary central axis (X) and/or the first imaginary longitudinal central axis, the internal wall (3.2) and/or the external wall (3.3) partially absorb said tangential movement tendency by both traction and compression according to the mentioned contact faces of the internal wall (3.2) and/or the external wall (3.3). In turn, each of the central bodies (3.1) also partially absorbs said tangential movement tendency by traction according to one of the faces thereof and simultaneously by compression according to the other one of the faces thereof.

According to this, the damping means provide the first body (1) with the capacity to move tangentially with respect to the imaginary central axis (X), the first imaginary longitudinal central axis, and/or the second imaginary longitudinal central axis, preventing excessive rigidity which transmits tangential vibrations to the rest of the apparatus in which said damping means is arranged, while at the same time absorbing or damping same in a smooth and quiet manner.

Each of the damping elements (3) is arranged such that an imaginary radial line can be defined, this imaginary radial line being developed perpendicular to the imaginary central axis (X), the first imaginary longitudinal central axis, and/or the second imaginary longitudinal central axis, in addition to through the central wall (3.1) from one of the two elongated sides (3.B) to the other one of the two elongated sides (3.B). A better way to counteract the tendency of the main body (1) to move radially is therefore provided.

For improved prevention or blocking of the first body (1) from the tendencies to move radially or perpendicularly with respect to the imaginary central axis (X), the first imaginary longitudinal central axis, and/or the second imaginary longitudinal central axis, each of the damping elements (3) is arranged to be sectioned by an imaginary plane (P), i.e., to be sectioned by said imaginary plane (P), which can be defined perpendicular to the imaginary central axis (X), the first imaginary longitudinal central axis, and/or the second imaginary longitudinal central axis, containing a center of gravity (G) of the electric motor (A). The imaginary plane (P), depicted by means of a discontinuous line in FIG. 3, preferably goes through the central wall (3.1), the internal wall (3.2), and the external wall (3.3), in addition to said center of gravity (G).

For further improved prevention or blocking of the first body (1) from the tendencies to move radially or perpendicularly with respect to the imaginary central axis (X), the first imaginary longitudinal central axis, and/or the second imaginary longitudinal central axis, said imaginary plane (P) preferably coincides with a midpoint of the longitudinal extension of the damping elements (3).

According to this, said imaginary plane (P) preferably coincides with a cross-section of the damping elements (3) located according to half of the longitudinal extension thereof, i.e., the imaginary plane (P) entails a division of the damping elements (3) according to two segments of the same longitudinal size and according to 50% of the longitudinal extension of the damping elements (3).

The invention claimed is:

1. A damping means of an electric motor (A) of an airflow generating apparatus with a longitudinal measurement according to an imaginary central axis (X), comprising:
    a first body, which defines the location of a compartment for housing the electric motor (A);
    a second body fixed to the apparatus, which defines the location of a housing for housing the first body;
    a damping element which is elastically deformable and has a longitudinal extension;
wherein the first body and the second body are separated from one another, the damping element being arranged such that it determines an attachment between the first body and the second body,
the damping element comprises a central wall, such that according to the longitudinal extension the central wall has two longitudinal ends and two elongated sides, and an internal wall externally fixed to the first body, the central wall being attached along the internal wall according to a longitudinal central part of the internal wall.

2. The damping means according to claim 1, wherein a first imaginary longitudinal central axis can be defined in the first body and a second imaginary longitudinal central axis can be defined in the second body, the first imaginary longitudinal central axis and the second imaginary longitudinal central axis coinciding with one another.

3. The damping means according to claim 1, wherein the first body comprises an inner side wall for radially and externally surrounding the electric motor (A) and the second body comprises an outer side wall arranged radially and externally surrounding the inner side wall, the damping element being arranged attaching the inner side wall with the outer side wall.

4. The damping means according to claim 1, wherein there are at least two damping elements, the damping elements being angularly distributed with respect to the imaginary central axis (X).

5. The damping means according to claim 1, wherein the central wall has an elongated laminar configuration.

6. The damping means according to claim 1, wherein the damping element is arranged such that an imaginary radial line can be defined perpendicular to the imaginary central axis (X) and through the central wall from one of the two elongated sides to the other one of the two elongated sides.

7. The damping means according to claim 1, wherein the damping element comprises an external wall internally fixed to the second body, the central wall being attached along the external wall according to a longitudinal central portion of the external wall.

8. The damping means according to claim 7, wherein the damping element comprises a constriction on at least one of the two elongated sides, the constriction having a smaller thickness than the internal and external wall thickness such that the central wall also has a thickness smaller than the internal and external wall thickness.

9. The damping means according to claim 1, wherein the damping element is arranged to be sectioned by an imaginary plane (P) perpendicular to the imaginary central axis (X) containing a center of gravity (G) of the electric motor (A).

10. The damping means according to claim 9, wherein the imaginary plane (P) coincides with a midpoint of the longitudinal extension of the damping element.

11. An airflow generating apparatus comprising the damping means according to claim 1.

12. The airflow generating apparatus according to claim 11, wherein the electric motor (A) comprises a stator (A.1) and a rotor (A.2) for generating a rotational movement, and at least one blade arranged for suctioning and driving air.

* * * * *